United States Patent
Lang et al.

(10) Patent No.: US 10,836,083 B2
(45) Date of Patent: Nov. 17, 2020

(54) MOLDING TOOL

(71) Applicant: OVERATH GMBH, Lohmar (DE)

(72) Inventors: Eberhard Lang, Heilbronn (DE); Udo Overath, Lohmar (DE)

(73) Assignee: OVERATH SLM GMBH, Lohmar (DE)

( * ) Notice: Subject to any disclaimer, the term of this patent is extended or adjusted under 35 U.S.C. 154(b) by 154 days.

(21) Appl. No.: 15/567,557

(22) PCT Filed: Apr. 25, 2016

(86) PCT No.: PCT/EP2016/059139
§ 371 (c)(1),
(2) Date: Oct. 18, 2017

(87) PCT Pub. No.: WO2016/173970
PCT Pub. Date: Nov. 3, 2016

(65) Prior Publication Data
US 2018/0111294 A1  Apr. 26, 2018

(30) Foreign Application Priority Data

Apr. 27, 2015 (EP) .................................... 15165259

(51) Int. Cl.
*B29C 44/34* (2006.01)
*B29C 33/04* (2006.01)
(Continued)

(52) U.S. Cl.
CPC .......... *B29C 44/3434* (2013.01); *B29C 33/04* (2013.01); *B29C 33/046* (2013.01);
(Continued)

(58) Field of Classification Search
CPC ... B29C 44/3434; B29C 33/04; B29C 33/046; B29C 44/58; B29K 2105/048; B29K 2905/00
(Continued)

(56) References Cited

U.S. PATENT DOCUMENTS 3,753,843 A * 8/1973 Hutchison ........... B29C 44/1266
428/116
3,837,769 A * 9/1974 Erlenbach ........... B29C 44/3434
425/4 R
(Continued)

FOREIGN PATENT DOCUMENTS

DE        29 11 120 A1    10/1980
DE        2911120 A1 * 10/1980 ........... B29C 44/445
(Continued)

*Primary Examiner* — Robert C Dye
*Assistant Examiner* — Guy F Mongelli
(74) *Attorney, Agent, or Firm* — Pauley Erickson & Swanson

(57) ABSTRACT

A molding tool for producing molded parts from expandable plastic beads. The molding tool has an inner wall facing the molded part and an outer wall facing away from the molded part, between which a hollow space is formed for conveying a heating/cooling medium, and the inner and outer walls are connected to each other in some areas by spacers. Inside the spacers, through bores are formed, which convey steam, pass through the outer and inner walls, and are sealed relative to the hollow space.

24 Claims, 2 Drawing Sheets

(51) Int. Cl.
*B29C 44/58* (2006.01)
*B29K 105/04* (2006.01)

(52) U.S. Cl.
CPC ........ *B29C 44/58* (2013.01); *B29K 2105/048* (2013.01); *B29K 2905/00* (2013.01)

(58) Field of Classification Search
USPC ....................................................... 425/470
See application file for complete search history.

(56) References Cited

U.S. PATENT DOCUMENTS

| | | | | |
|---|---|---|---|---|
| 3,941,528 | A * | 3/1976 | Cotterell | B29C 33/10 425/4 R |
| 4,081,225 | A * | 3/1978 | Yaita | B29C 33/10 249/141 |
| 4,192,638 | A * | 3/1980 | Lezier | B29C 44/3426 249/111 |
| 4,333,897 | A * | 6/1982 | Hayashi | B29C 44/445 249/79 |
| 4,439,122 | A * | 3/1984 | Besse | B29C 44/445 249/145 |
| 4,801,361 | A * | 1/1989 | Bullard | B29C 44/445 264/101 |
| 4,813,859 | A * | 3/1989 | Bullard | B29C 44/58 425/143 |
| 5,037,592 | A * | 8/1991 | Erlenbach | B29C 44/3419 264/51 |
| 5,391,337 | A * | 2/1995 | Kearney | B29C 33/0011 264/219 |
| 6,558,592 | B1 * | 5/2003 | Nohara | B29C 44/58 264/51 |
| 2002/0179272 | A1 * | 12/2002 | Shimokawa | B29C 33/3842 164/6 |
| 2007/0108668 | A1 * | 5/2007 | Hutchinson | B29C 33/04 264/521 |
| 2011/0009508 | A1 * | 1/2011 | Chinomi | B29B 9/065 521/60 |

FOREIGN PATENT DOCUMENTS

| | | | |
|---|---|---|---|
| DE | 29 36 273 A1 | 3/1981 | |
| DE | 199 03 699 A1 | 8/2000 | |
| DE | 19903699 A1 * | 8/2000 | ............ B29C 33/04 |
| DE | 20 2007 006162 U1 | 8/2007 | |
| DE | 202007006162 U1 * | 8/2007 | ......... B29C 44/3419 |
| GB | 1 563 324 A | 3/1980 | |
| GB | 1563324 A * | 3/1980 | |
| GB | 15633324 A * | 3/1980 | |

* cited by examiner

MOLDING TOOL

BACKGROUND OF THE INVENTION

Field of the Invention

This invention relates to a molding tool for producing molded parts from expandable plastic beads. The molding tool has an inner wall facing the molded part and an outer wall facing away from the molded part, between which a hollow space is formed for conveying a heating/cooling medium, and the inner and outer walls are connected to each other in some areas by spacers.

Discussion of Related Art

Molding tools of the type mentioned above which are for producing molded parts from expandable plastic beads, such as expandable polypropylene (EPP) or expandable polystyrene (EPS), are known in a wide variety of forms.

Conventionally, such a molding tool is composed of at least two molding tool parts, which jointly form a mold cavity in which the molded body is produced when plastic beads are dispensed into it, heat is supplied, and the adjacent plastic beads are partially welded to one another. In this case, a predetermined quantity of plastic beads is usually introduced into the closed mold cavity while the mold halves are cooled and then the molding tool parts and the plastic beads contained in the mold cavity are heated to a suitable temperature of, for example, approximately 140 to 145° C. through the introduction of large quantities of steam. Then the tool that has previously been expensively heated is cooled back down to a temperature of about 60 to 70° C. by spraying large quantities of cooling water from the back side of the mold cavity before the molding tool parts are opened and the molded part can be removed. In this intrinsically established process, the molding tool is very solidly built, usually of metallic materials, and on its outside facing away from the mold cavity, has a generously dimensioned steam chamber in order to ensure a rapid and sufficient heating of both the molding tool and the plastic beads inside the mold cavity, which must be completely penetrated by the steam in order to ensure a homogeneous melting. Thus, not only are the molding tools that are used expensive, but also large quantities of steam and cooling water are required, which results in an extremely disadvantageous energy footprint of the known devices. In addition, the large quantities of water that are used place unusual demands on the installation site of such molding machines.

There have thus already been a variety of attempts to optimize molding tools of this type.

German Patent Reference DE 29 36 273 A1, which defines the species, discloses a two-part metal mold for producing molded bodies from pre-foamed plastic granulate, whose metal walls are embodied as double-shelled and are spaced apart from each other with spacers, and inside the double shells, hollow spaces are formed, which can be used to convey a heating/cooling medium through one molding tool part and in the opposing molding tool part, can be used to convey steam into the mold cavity. In this known molding tool, though, it is disadvantageous that the respective molding tool parts can only be acted on with one medium at a time, such as the steam is introduced in the region of one molding tool part, while the temperature control is carried out with the heating/cooling medium by the other molding tool part so that the parts that can be produced with molding tools of this kind can only be embodied as thin-walled because otherwise, neither a sufficient temperature control nor a sufficient penetration of the molded part with steam is assured. The known molding tool is thus only suitable for an extremely limited application range and is not able to replace the disadvantageous standard molding tool mentioned above for the production of a wide variety of molded parts.

SUMMARY OF THE INVENTION

One object of this invention is to avoid disadvantages of the prior art and to provide a molding tool, which with a significantly reduced energy consumption and simultaneously markedly decreased cycle times, permits an efficient, high-quality manufacture of molded parts from expandable plastic beads.

In order to attain the above and other objects, this invention provides embodiments of a molding tool with the features and other embodiments and modifications of this invention as described in this specification and in the claims.

The molding tool proposed by this invention has through bores inside the spacers, which bores are for conveying steam, passing through the outer and inner walls, and sealed relative to the hollow space.

In this way, it is possible to provide a flow of heating and cooling medium through the molding tool, namely in the region of the hollow space between the inner and outer wall in order to control the temperature thereof and at the same time, to also convey steam through the through bores in order to control the temperature of the molding tool and the molded part that is to be formed inside the molding tool, without the risk of this steam mixing with the heating and cooling medium. It is thus possible to produce a molding tool that can be manufactured with significantly smaller dimensions as compared to the prior art and also both the heating and cooling medium and the steam can be conveyed through a corresponding arrangement of through bores to almost all points in the molding tool and in particular, can also be suitably provided and applied to critical points of the molded part that is to be produced, for example, thick and thin points of the material and the like.

According to one embodiment of this invention, the spacers are positioned at regular intervals from one another in the form of a grid, thus making it possible for a correspondingly large number of through bores to be provided for conveying steam in the molding tool.

Also, particularly when arranged at regular intervals in the form of a grid, the spacers can also function as flow dividers for the heating/cooling medium that can be conveyed through the hollow space so that this medium is favorably and uniformly blended and a homogeneous temperature distribution is established as well as a good heat transfer.

The inner and outer walls can be oriented essentially parallel to each other and spaced a constant distance apart from each other. The spacers can extend perpendicular to the inner and outer walls. This keeps the molding tool according to this invention very compact.

According to another embodiment, between adjacent spacers and the surfaces of the inner and outer walls facing the hollow space, respective circular through flow openings are provided for the heating and cooling medium, which in particular makes it possible to embody or form the spacers as approximately columnar. They then have a round cross-section, for example.

It is also possible for the through bores inside the spacers to taper conically starting from the outer wall in the direction of the inner wall, making it possible to achieve a longer service life due to a self-cleaning effect on the side of the mold part cavity. Also, this measure also achieves a considerable improvement of the surface quality of the molded part to be manufactured.

The through bores can, for example, conically taper from an outer diameter of approximately 1.5 to 2 mm down to 0.3 to 0.5 mm in the region of the exit to the mold cavity.

The inner and outer walls of the molding tool according to this invention can be embodied as very thin, for example, having a wall thickness of 0.3 to 3 mm.

The hollow space between the outer and inner walls can also be embodied as very small, for example with an internal height of 2 to 12 mm, preferably 3 to 6 mm.

The spacers, which are embodied as columnar according to one embodiment of this invention, can have a diameter of approximately 4 to 6 mm and can be spaced equidistantly apart from one another in a grid-like pattern, with adjacent spacers spaced apart from one another by approximately 5 to 25 mm.

It is also possible on the outside of the outer wall facing away from the hollow space to form a steam chamber that communicates with the through bores, from which the steam can flow directly into the through bores and from there into the molding cavity.

This steam chamber can also be kept very compact and, for example, can have an inner height of 2 to 4 mm.

The inner wall of the molding tool according to this invention can also be embodied or formed with a multitude of capillary tubes, which extend from the inner surface facing the molded part to the hollow space. These capillary tubes can have a diameter of 0.1 to 1.0 mm, for example 0.3 mm. In a molding tool of this type, it is possible to effectively counteract the filler formation due to the occurrence of condensate during the production of molded parts.

The steaming of the expandable plastic beads that have been dispensed into the mold cavity inevitably results in a formation of condensate on the surface of the inner wall facing the subsequent molded part. According to this invention, this condensate is drawn into the capillary tubes by capillary action. As soon as the steaming causes the molded part to form, the molded part expands against the surface of the inner wall and displaces the condensate further into the capillary tubes, from where the condensate travels into the hollow space and into the heating and cooling medium that is then conveyed through the hollow space. Conversely, though, the heating and cooling medium, as it passes through the hollow space, cannot pass through the capillary tubes into the mold cavity because the expanded molded part closes the capillary tubes in the mold cavity in a sealed fashion.

According to another embodiment of this invention, a molding tool according to this invention can particularly be integrally manufactured out of sintered metal so that the low wall thicknesses and specific geometries can be manufactured in a simple way as explained above. In particular, selective laser sintering (SLS) can be used to produce such molding tools according to this invention with through bores extending through spacers embodied or formed in the form of columns in integral in one operation from suitable materials. In particular, suitable metal powders are used for this purpose.

BRIEF DESCRIPTION OF THE DRAWINGS

Other embodiments and details of this invention are explained in greater detail in view of exemplary embodiments shown in the drawings, wherein.

DETAILED DESCRIPTION OF THE INVENTION

Figure 1:
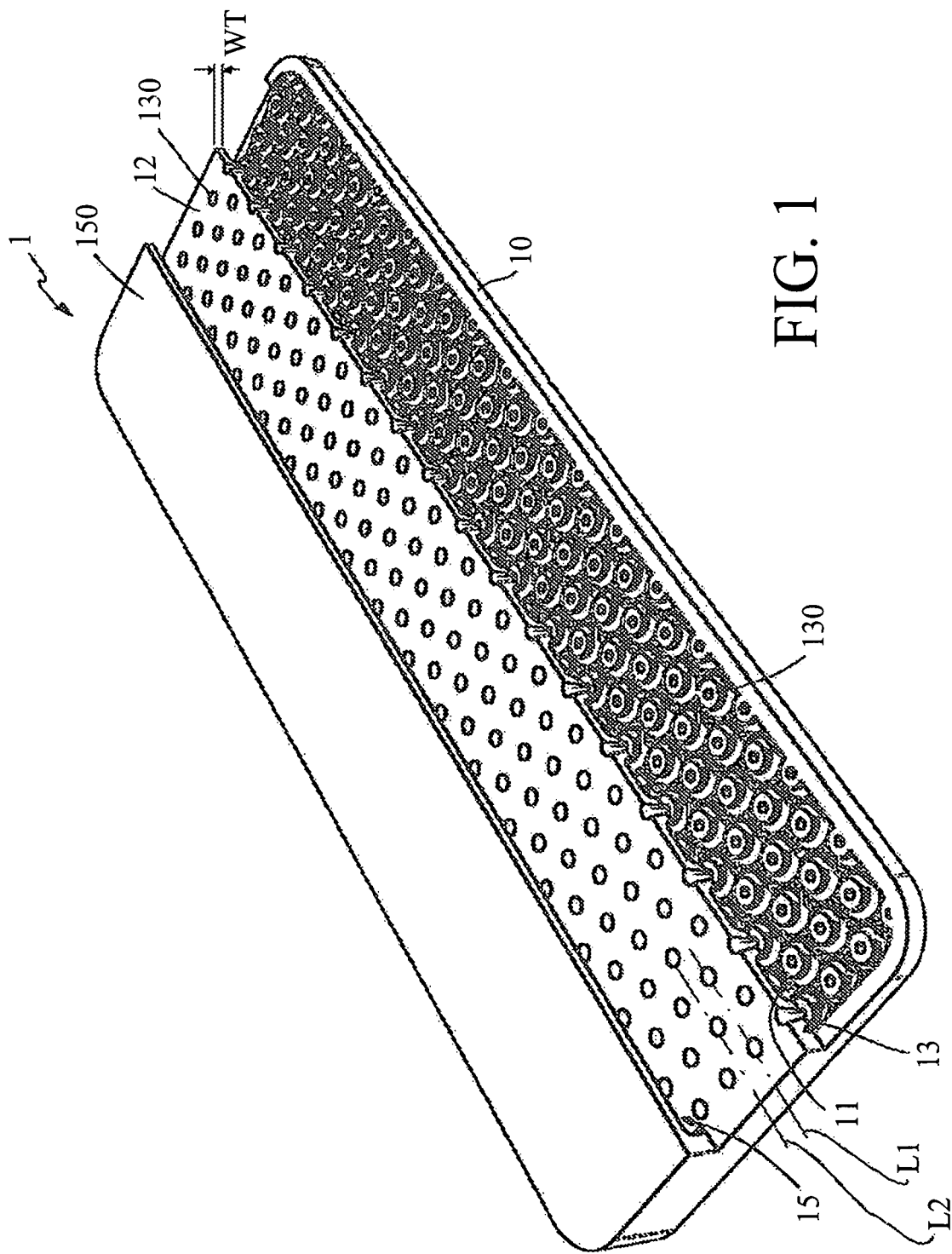
FIG. 1 shows a stepped section taken through a molding tool according to this invention.
Figure 2:
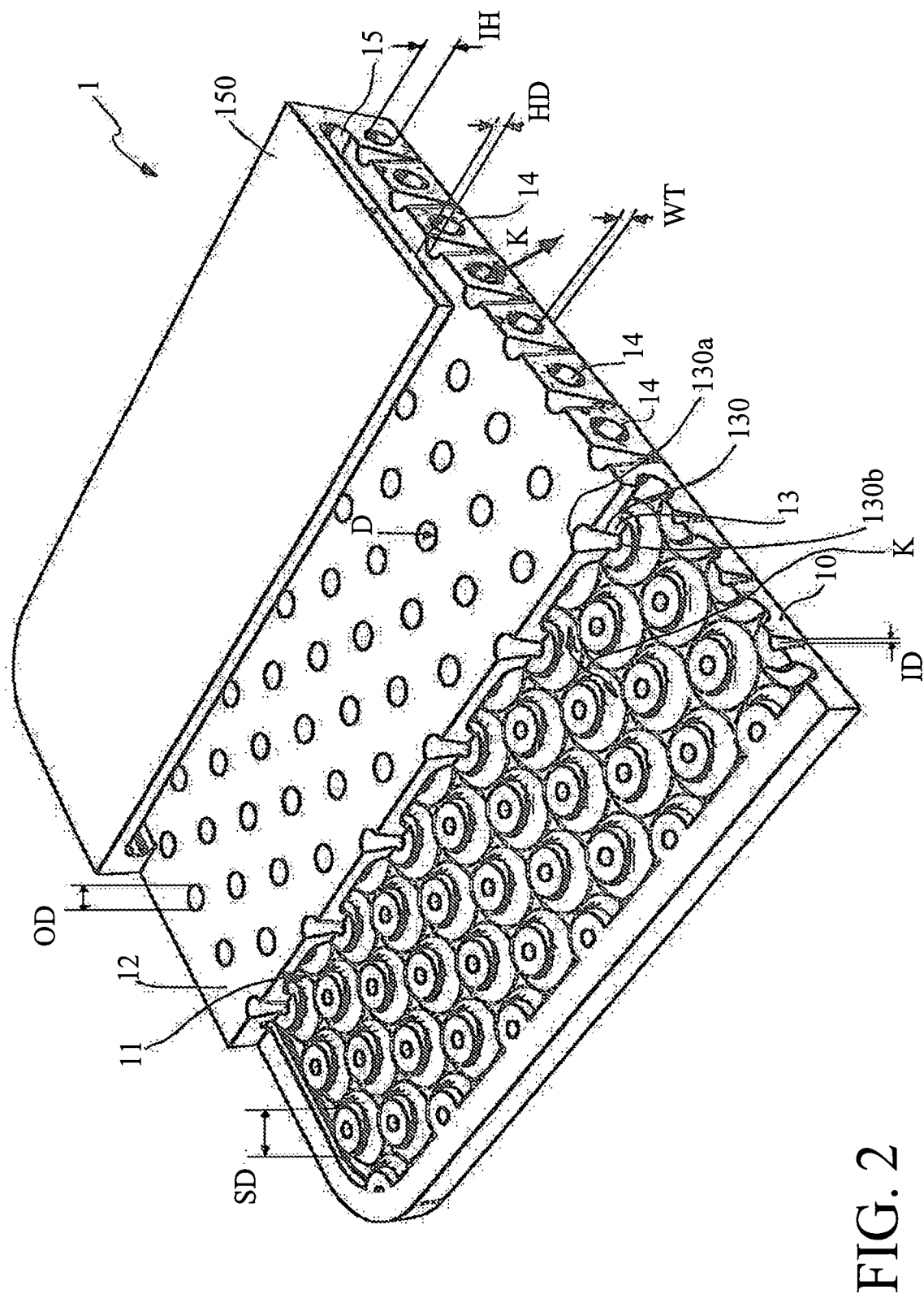
FIG. 2 shows the section taken through the molding tool according to FIG. 1, in an enlarged view from a different angle.

FIGS. 1 and 2 show an exemplary embodiment of a molding tool according to this invention or more precisely stated, of a molding tool part thereof, which in cooperation with another molding tool part that is not shown here, but that is in principle constructed in a similar way, delimits a mold cavity in which a molded part can be produced from expandable plastic beads in an intrinsically known way.

The molding tool part, also referred to simply as the molding tool or the mold, is identified as a whole with the reference numeral 1 and includes an inner wall 10 facing the molded part and the mold cavity and an outer wall 12 facing away from the molded part and these walls are positioned spaced apart from each other by spacers 13 embodied or formed in the form of columns so that between the spacers 13, a continuous hollow space 11 is formed.

The spacers 13 are provided at regular intervals, particularly in a grid-like arrangement. For example, they are arranged in lines that are labeled L1 and L2 in FIG. 1. The individual spacers of a line L1 are arranged so that on the adjacent line L2, the spacers are each positioned offset by one-half the spacing distance. All of the lines L1, L2 extend parallel to one another. The distance between adjacent spacers is approximately 5-25 mm.

The columnar embodiment of the spacers, which have a diameter of 4 to 6 mm for example, leaves room between the surfaces of the inner wall 10 and outer wall 12 facing the hollow space 11 and the respective spacers 13 for a circular through flow opening 14. It is thus possible, inside the hollow space 11, to allow a heating and cooling medium indicated with the arrow K in FIG. 2 to circulate in order to heat or cool the surfaces of the molding tool to the desired temperatures before, during, and after production of the molded part. The heating and cooling medium circulates around the spacers 13 arranged regularly in a grid and they serve as flow dividers so that a homogeneous distribution and good circulation of the heating and cooling medium K is achieved. The connections for the heating/cooling medium are not shown but can be provided at a suitable point.

This embodiment makes it possible to provide the depicted molding tool with a cooling that closely follows its contours when, after completion of the foaming step, a cooling medium such as water is conveyed through the hollow space. In this way, in comparison to known methods that are based on spray drying, a significant reduction in cooling water consumption can be achieved and there is no longer coolant escape of any consequence from a molding machine that is equipped with the molding tool according to this invention, so that a virtually dry operation is achieved. This makes it possible to achieve a reduction in cooling water consumption of up to 75%.

Also, a through bore 130 is formed inside each columnar spacer 13 and the through bores pass through the inner and outer walls 10, 12 of the molding tool 1. The through bores, starting from the outer surface 12 and the inlet opening 130*a* there, taper conically in the direction of the inner surface and the outlet opening 130b there, for example, from a starting diameter of approximately 1.5 to 2 mm down to 0.3 to 0.5 mm.

It is thus possible, through each of the individual spacers 13 in the region of or near the through bore 130 embodied therein, to convey steam D from the outer wall 12 in the direction of the inner wall 10 and from there, into the mold cavity so that the expandable plastic beads, which have been dispensed into the mold cavity in an intrinsically known way, can be steamed with hot steam and melted to form the molded part.

The steam chamber 15 provided for the steam treatment is implemented by a wall 150 that is mounted onto and spaced a certain distance apart from the outer wall 12, where the inner height HD of the steam chamber is for example 2 to 4 mm. Here, too, for the sake of simplicity, connections and supply lines to the steam chamber 15 are not shown.

The embodiment of through bores 130 inside the spacers 13 ensures that the coolant circulating in the hollow space 11 is completely separated from the steam D conveyed through the through bores 130 and no mixing of the two occurs, which also makes it possible to considerably reduce steam consumption as compared to known methods. A steam reduction in comparison to conventional methods on the order of 65% is possible.

The above-explained conical tapering of the through bores 130 for the passage of steam also significantly improves the surface of the resulting molded parts and increases the service life of such a molding tool 1 because a self-cleaning effect occurs and the molded part compound is effectively prevented from penetrating into the through bores 130 for the steam. Furthermore, the grid-like arrangement of the through bores 130 inside the regularly spaced spacers and the flow of cooling medium distributed across the entire area of the molding tool 1 enables temperature control and steaming that are effective and largely independent of the geometry of the molded part that is to be produced. Naturally, depending on the requirements, in certain regions of the molding tool, a higher or lower number of spacers 13 and through bores 130 embodied therein can be provided for passage of the steam D.

In particular, despite the complex geometry of the molding tool 1 shown in the drawings, it can be produced integrally in one piece and in a single operation from a suitable metallic material by using the so-called laser sintering method and the molding tool mass can be reduced through a significant reduction in the required wall thicknesses. The inner and outer walls 10, 12 can be produced with wall thicknesses of 0.3 to 3 mm, for example. In any case, the large number of spacers 130 provided ensures a high stability of the inner and outer walls 10, 12 adjoining the hollow space. The tool weight of such a molding tool can thus be considerably reduced as compared to the conventional method. In this case, weight reductions of up to 70% are possible.

Through such a weight reduction, it is also possible for the entire machine that accommodates the molding tool to be of a significantly smaller design because the masses to be moved are also considerably reduced.

Also, the required process time for molding a molded part is also significantly reduced by this particularly compact embodiment of a molding tool because the heating and cooling times are considerably reduced in accordance with the achievable mass reduction in the molding tool and the achievable steaming and cooling. Processing time reductions of more than 40% as compared to conventional manufacturing processes have been achieved.

In order to carry off any condensate forming in the mold cavity, particularly on the surface of the inner wall 10, it is also possible to provide capillary tubes, not shown here, with an average diameter of such as 0.1 to 1.0 mm, preferably 0.3 mm, in the inner wall 10 in a sufficient, for example, regular arrangement, which extend into the hollow space 11 and by which condensate can be carried off into the hollow space 11. This effectively prevents a filler formation on the surface of the molded part.

The molding tool according to this invention is particularly suitable for producing molded parts from expandable plastic beads, but this invention is not limited and this principle can also be used with other suitable molded part manufacturing processes. It is also possible to use other manufacturing processes in addition to the above-mentioned laser sintering to produce the molding tool according to this invention.

The invention claimed is:

1. A molding tool (1) for producing molded parts from expandable plastic beads, the molding tool (1) having an inner wall (10) facing the molded part and an outer wall (12) facing away from the molded part between which a hollow space (11) is configured to convey a heating/cooling medium (K), the inner and outer walls (10, 12) are connected to each other in areas by spacers (13), inside the spacers (13) through bores (130) are formed and convey steam, wherein the through bores (130) pass through the outer and inner walls (10, 12) and are sealed relative to the hollow space (11), wherein the molding tool is produced integrally in one piece out of sintered metal and the inner wall (10) comprises an inner surface facing the molded part and a multiplicity of capillary tubes extending through the inner wall connecting the inner surface to the hollow space (11), the capillary tubes configured to divert condensate from the inner surface into the hollow space (11).

2. The molding tool (1) according to claim 1, wherein the spacers (13) are positioned at regular intervals from one another in the form of a grid.

3. The molding tool (1) according to claim 2, wherein the spacers (13) function as flow dividers for the heating/cooling medium (K) that can be conveyed through the hollow space (11).

4. The molding tool (1) according to claim 3, wherein the inner and outer walls (10, 12) are oriented approximately parallel to each other and spaced a constant distance apart from each other and the spacers (13) extend perpendicular to the inner and outer walls (10, 12).

5. The molding tool (1) according to claim 4, wherein between adjacent spacers (13) and the surfaces of the inner and outer walls (10, 12) facing the hollow space (11), circular through flow openings (14) are provided for the heating/cooling medium (K).

6. The molding tool (1) according to claim 5, wherein the through bores (130) inside the spacers (13) taper conically starting from the outer wall (12) in a direction of the inner wall (10).

7. The molding tool (1) according to claim 6, wherein the through bores (130) inside the spacers (13) conically taper from a starting diameter (OD) of approximately 1.5 to 2 mm down to an inner diameter (ID) of 0.3 to 0.5 mm.

8. The molding tool (1) according to claim 7, wherein the inner and outer walls (10, 12) each has a wall thickness (WT) of 0.3 to 3 mm.

9. The molding tool (1) according to claim 8, wherein the hollow space (11) between the outer wall (12) and the inner wall (10) has an inner height (IH) of 3 to 6 mm.

10. The molding tool (1) according to claim 9, wherein the spacers (13) are columnar and have a diameter (SD) of 4 to 6 mm.

11. The molding tool (1) according to claim 10, wherein on the outside of the outer wall (12) facing away from the hollow space (11), a steam chamber (15) is formed and communicates with the through bores (130).

12. The molding tool (1) according to claim 11, wherein the steam chamber (15) has an inner height (HD) of 2 to 4 mm.

13. The molding tool (1) according to claim 1, wherein the spacers (13) function as flow dividers for the heating/cooling medium (K) that can be conveyed through the hollow space (11).

14. The molding tool (1) according to claim 1, wherein the inner and outer walls (10, 12) are oriented approximately parallel to each other and spaced a constant distance apart from each other and the spacers (13) extend perpendicular to the inner and outer walls (10, 12).

15. The molding tool (1) according to claim 1, wherein between adjacent spacers (13) and the surfaces of the inner and outer walls (10, 12) facing the hollow space (11), circular through flow openings (14) are provided for the heating/cooling medium (K).

16. The molding tool (1) according to claim 1, wherein the through bores (130) inside the spacers (13) taper conically starting from the outer wall (12) in a direction of the inner wall (10).

17. The molding tool (1) according to claim 1, wherein the inner and outer walls (10, 12) each has a wall thickness (WT) of 0.3 to 3 mm.

18. The molding tool (1) according to claim 1, wherein the hollow space (11) between the outer wall (12) and the inner wall (10) has an inner height (IH) of 3 to 6 mm.

19. The molding tool (1) according to claim 1, wherein the spacers (13) are columnar and have a diameter (SD) of 4 to 6 mm.

20. The molding tool (1) according to claim 1, wherein on the outside of the outer wall (12) facing away from the hollow space (11), a steam chamber (15) is formed and communicates with the through bores (130).

21. The molding tool (1) according to claim 1, wherein the inner wall (10), the outer wall (12), and the spacers (13) are all connected integrally in one piece, formed of the sintered metal.

22. The molding tool (1) according to claim 1, wherein the inner wall (10) is integrally connected to the outer wall (12) to enclose the hollow space (11), and the spacers (13) are integrally connected to and between the inner wall (10) and the outer wall (12), extending across the hollow space (11).

23. The molding tool (1) according to claim 22, wherein each of the spacers (13) includes a tapered through bore (130) extending through and from the outer wall (12) toward and through the inner wall (10).

24. The molding tool (1) according to claim 1, wherein the condensate from the inner surface combines with the heating/cooling medium (K) within the hollow space (11).

\* \* \* \* \*